(12) United States Patent
Sheldon et al.

(10) Patent No.: US 7,673,459 B2
(45) Date of Patent: Mar. 9, 2010

(54) SYSTEM AND METHOD FOR PROVIDING AIR TO A COMPRESSOR OF AN AIRCRAFT AUXILIARY GAS TURBINE ENGINE

(75) Inventors: Karl Edward Sheldon, Rexford, NY (US); John Turco, West Chester, OH (US)

(73) Assignee: General Electric Company, Schenectady, NY (US)

( * ) Notice: Subject to any disclaimer, the term of this patent is extended or adjusted under 35 U.S.C. 154(b) by 879 days.

(21) Appl. No.: 11/398,108

(22) Filed: Apr. 5, 2006

(65) Prior Publication Data

US 2007/0234731 A1 Oct. 11, 2007

(51) Int. Cl.
*F02C 6/06* (2006.01)
*F02C 7/00* (2006.01)

(52) U.S. Cl. ............ 60/782; 60/39.183; 60/785; 62/DIG. 5; 454/76

(58) Field of Classification Search .......... 60/39.15, 60/39.183, 224, 225, 772, 782, 785; 62/402, 62/DIG. 5; 244/58; 417/405, 406, 407, 408, 417/409; 454/71, 76
See application file for complete search history.

(56) References Cited

U.S. PATENT DOCUMENTS

| | | | | |
|---|---|---|---|---|
| 3,410,616 A | * | 11/1968 | Dee | ............................ 384/107 |
| 5,442,904 A | * | 8/1995 | Shnaid | ............................. 60/783 |
| 5,899,085 A | * | 5/1999 | Williams | ....................... 62/236 |
| 5,967,461 A | * | 10/1999 | Farrington | ................ 244/118.5 |
| 6,283,410 B1 | | 9/2001 | Thompson | |
| 6,634,596 B2 | | 10/2003 | Albero et al. | |
| 6,704,625 B2 | | 3/2004 | Albero et al. | |
| 6,868,664 B2 | | 3/2005 | Albero et al. | |
| 2004/0144096 A1 | | 7/2004 | Wollenweber | |

* cited by examiner

*Primary Examiner*—Louis J Casaregola
(74) *Attorney, Agent, or Firm*—William Scott Andes

(57) ABSTRACT

A system for providing air to a compressor of an auxiliary gas turbine engine of an aircraft. A system turbine has an inlet adapted to receive compressed air from the aircraft. A system compressor is mechanically coupled to the system turbine and has an inlet adapted to receive atmospheric air. The outlets of the system turbine and the system compressor are fluidly connectable to the inlet of the compressor of the auxiliary gas turbine engine. A method includes providing compressed air from an aircraft to an inlet of a system turbine mechanically coupled to a system compressor. The method includes providing atmospheric air to an inlet of the system compressor. The method includes providing the inlet of the compressor of an auxiliary gas turbine engine with air from an outlet of the system turbine and with air from an outlet of the system compressor.

15 Claims, 1 Drawing Sheet

SYSTEM AND METHOD FOR PROVIDING AIR TO A COMPRESSOR OF AN AIRCRAFT AUXILIARY GAS TURBINE ENGINE

BACKGROUND OF THE INVENTION

The present invention relates generally to gas turbine engines, and more particularly to a system and to a method for providing air to an inlet of a compressor of a non-aircraft-propelling auxiliary gas turbine engine of an aircraft having an aircraft-propelling gas turbine engine.

Known auxiliary gas turbine engines are installed in some aircraft to provide mechanical shaft power to electrical and hydraulic equipment such as electrical power generators and alternators and hydraulic pumps. The inlet of the compressor of such auxiliary gas turbine engines receives air from the atmosphere. Because the density of air decreases with increasing altitude, such auxiliary gas turbine engines, at increased altitude, must either work harder to produce a desired shaft power resulting in an increased operating temperature or must reduce the output shaft power to stay within an operating temperature limit.

Still, scientists and engineers continue to seek improved systems and methods for providing air to an inlet of a compressor of a non-aircraft-propelling gas turbine engine of an aircraft having an aircraft-propelling gas turbine engine.

BRIEF DESCRIPTION OF THE INVENTION

A first expression of a first embodiment of the invention is for a system for providing air to an inlet of a compressor of a non-aircraft-propelling auxiliary gas turbine engine of an aircraft having an aircraft-propelling gas turbine engine. The system includes a system turbine and a system compressor. The system turbine has an inlet and an outlet, wherein the inlet of the system turbine is adapted to receive compressed air from the aircraft. The system compressor is mechanically coupled to the system turbine and has an inlet and an outlet, wherein the inlet of the system compressor is adapted to receive atmospheric air. The outlets of the system turbine and the system compressor are fluidly connectable to the inlet of the compressor of the auxiliary gas turbine engine.

A second expression of a first embodiment of the invention is for a system for providing air to an inlet of a compressor of a non-aircraft-propelling auxiliary gas turbine engine of an aircraft having an aircraft-propelling gas turbine engine. The system includes a system turbine and a system compressor. The system turbine has an inlet and an outlet, wherein the inlet of the system turbine receives compressed air from the aircraft. The system compressor is mechanically coupled to the system turbine and has an inlet and an outlet, wherein the inlet of the system compressor receives atmospheric air. The outlets of the system turbine and the system compressor are in fluid communication with the inlet of the compressor of the auxiliary gas turbine engine.

A method of the invention is for providing air to an inlet of a compressor of a non-aircraft-propelling auxiliary gas turbine engine of an aircraft having an aircraft-propelling gas turbine engine. The method includes providing compressed air from the aircraft to an inlet of a system turbine mechanically coupled to a system compressor. The method includes providing atmospheric air to an inlet of the system compressor. The method includes providing the inlet of the compressor of the auxiliary gas turbine engine with air from an outlet of the system turbine and with air from an outlet of the system compressor.

BRIEF DESCRIPTION OF THE DRAWINGS

The accompanying drawings illustrate an embodiment of the invention wherein.

DETAILED DESCRIPTION OF THE INVENTION

Figure 1:
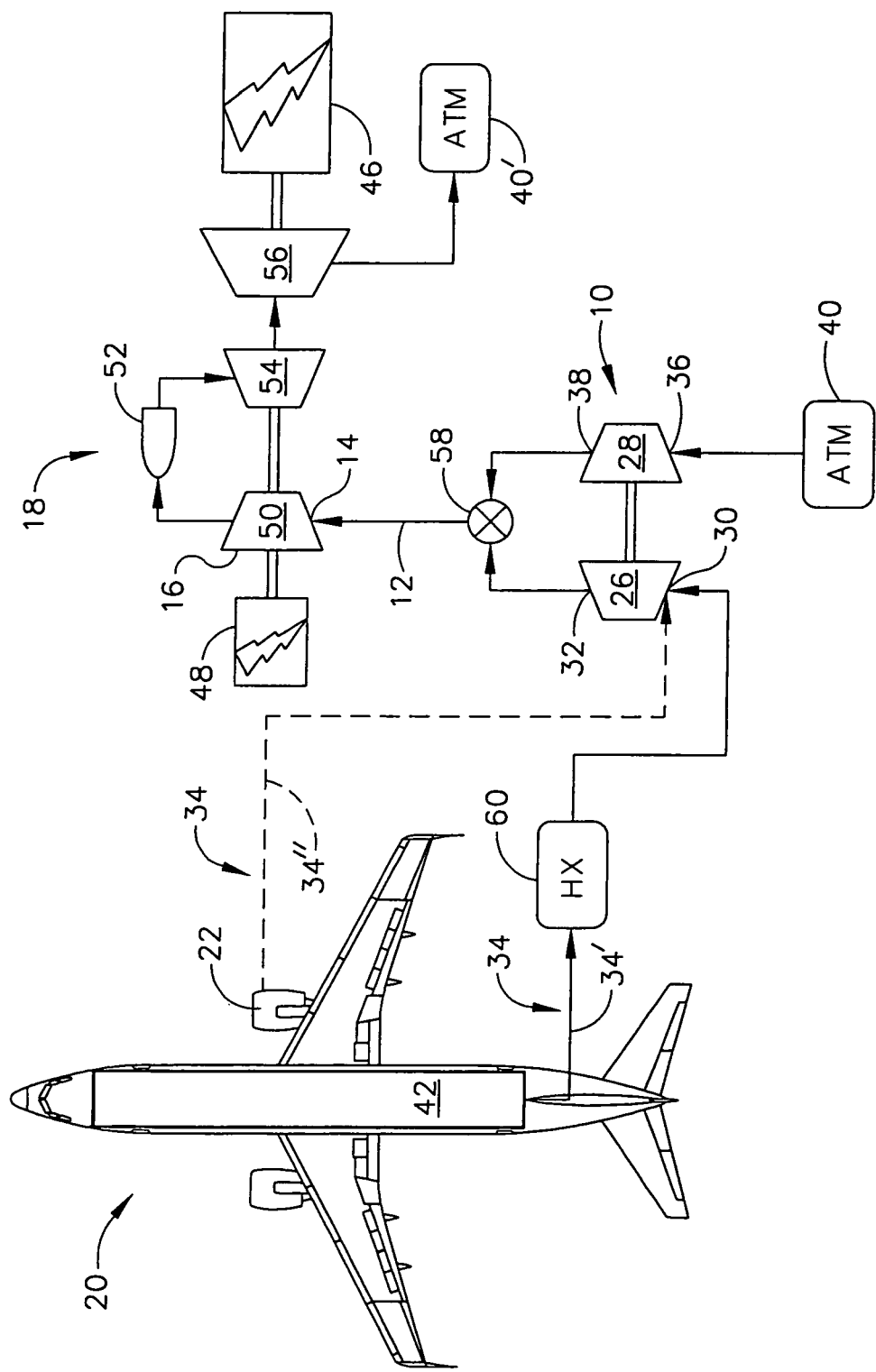
FIG. 1 is a schematic representation of an embodiment of an aircraft having an aircraft-propelling gas turbine engine, a non-aircraft-propelling auxiliary gas turbine engine connected to two electrical generators, and a system for providing air to an inlet of a compressor of the auxiliary gas turbine engine.

Referring now to the drawings, FIG. 1 discloses a first embodiment of the invention. A first expression of the embodiment of FIG. 1 is for a system 10 for providing air 12 to an inlet 14 of a compressor 16 of a non-aircraft-propelling auxiliary gas turbine engine 18 of an aircraft 20 having an aircraft-propelling gas turbine engine 22. The system 10 includes a system turbine 26 and a system compressor 28. The system turbine 26 has an inlet 30 and an outlet 32, wherein the inlet 30 of the system turbine 26 is adapted to receive compressed air 34 from the aircraft 20. The system compressor 28 is mechanically coupled to the system turbine 26 and has an inlet 36 and an outlet 38, wherein the inlet 36 of the system compressor 28 is adapted to receive atmospheric air 40. The outlets 32 and 38 of the system turbine 26 and the system compressor 28 are fluidly connectable to the inlet 14 of the compressor 16 of the auxiliary gas turbine engine 18. It is noted that an aircraft-propelling gas turbine engine of an aircraft is an aircraft gas turbine engine whose main purpose is aircraft propulsion and that a non-aircraft-propelling gas turbine engine of an aircraft is an aircraft gas turbine engine whose main purpose is not aircraft propulsion. In a first example, the atmospheric air 40 to be received by the inlet 36 of the system compressor 28 is ram air from an inlet of an ECS (Environmental Control System). In a second example, the atmospheric air 40 to be received by the inlet 36 of the system compressor 28 is ram air from an aircraft inlet dedicated to supplying air to the inlet 36 of the system compressor 28. Other examples are left to those skilled in the art.

In a first enablement of the first expression of the first embodiment of FIG. 1, the aircraft 20 has a cabin 42, and the compressed air 34 is pressurized air 34' from the cabin 42. In a second enablement, the compressed air 34 is pressurized air 34" (shown in dashed line, such as bleed air from a compressor and/or a bypass duct) from the aircraft-propelling gas turbine engine 22. In a third enablement, the compressed air 34 is a combination of pressurized air 34' from the cabin and pressurized air 34" from the aircraft-propelling gas turbine engine 22. Other enablements are left to the artisan.

In one implementation of the first expression of the first embodiment of FIG. 1, the auxiliary gas turbine engine 18 is operatively connected to an electric power generator 46. In one variation, the auxiliary gas turbine engine 18 is also operatively connected to a second electric power generator 48. In the same or a different variation, the auxiliary gas turbine engine 18 includes a high-pressure compressor 50, a combustor 52, a high-pressure turbine 54 and a low-pressure turbine 56 (which, in one example, discharges gas to the atmosphere 40') as shown, wherein the operation of such components is well known in the art. It is noted that the flow of gas in FIG. 1 is indicated by arrowed lines and that mechanical shaft connections in FIG. 1 are indicated by non-arrowed lines.

In one application of the first expression of the first embodiment of FIG. 1, the system 10 also includes a flow mixer 58, wherein the outlets 32 and 38 of the system turbine 26 and the system compressor 28 are fluidly connectable through the flow mixer 58 to the 14 inlet of the compressor 16 of the auxiliary gas turbine engine 18. In the same or a different application, the outlets 32 and 38 of the system turbine 26 and the system compressor 28 are adapted to have substantially equal discharge pressures. In the same or a different application, the system 10 also includes a heat exchanger 60 adapted to receive heat from the aircraft 20 and to give up heat to the compressed air 34 upstream of the inlet 30 of the system turbine 26.

A second expression of the first embodiment of FIG. 1 is for a system 10 for providing air 12 to an inlet 14 of a compressor 16 of a non-aircraft-propelling auxiliary gas turbine engine 18 of an aircraft 20 having an aircraft-propelling gas turbine engine 22. The system 10 includes a system turbine 26 and a system compressor 28. The system turbine 26 has an inlet 30 and an outlet 32, wherein the inlet 30 of the system turbine 26 receives compressed air 34 from the aircraft 20. The system compressor 28 is mechanically coupled to the system turbine 26 and has an inlet 36 and an outlet 38, wherein the inlet 36 of the system compressor 28 receives atmospheric air 40. The outlets 32 and 38 of the system turbine 26 and the system compressor 28 are in fluid communication with the inlet 14 of the compressor 16 of the auxiliary gas turbine engine 18.

In a first enablement of the second expression of the first embodiment of FIG. 1, the aircraft 20 has a cabin 42, and the compressed air 34 is pressurized air 34' from the cabin 42. In a second enablement, the compressed air 34 is pressurized air 34" (shown in dashed line, such as bleed air from a compressor and/or a bypass duct) from the aircraft-propelling gas turbine engine 22. In a third enablement, the compressed air 34 is a combination of pressurized air 34' from the cabin and pressurized 34" air from the aircraft-propelling gas turbine engine 22. Other enablements are left to the artisan.

In one implementation of the second expression of the first embodiment of FIG. 1, the auxiliary gas turbine engine 18 is operatively connected to an electric power generator 46. In one variation, the auxiliary gas turbine engine 18 is also operatively connected to a second electric power generator 48. In the same or a different variation, the auxiliary gas turbine engine 18 includes a high-pressure compressor 50, a combustor 52, a high-pressure turbine 54 and a low-pressure turbine 56 (which, in one example, discharges gas to the atmosphere 40') as shown, wherein the operation of such components is well known in the art. It is noted that the flow of gas in FIG. 1 is indicated by arrowed lines and that mechanical shaft connections in FIG. 1 are indicated by non-arrowed lines.

In one application of the second expression of the first embodiment of FIG. 1-1, the system 10 also includes a flow mixer 58, wherein the outlets 32 and 38 of the system turbine 26 and the system compressor 28 are in fluid communication, through the flow mixer 58, with the 14 inlet of the compressor 16 of the auxiliary gas turbine engine 18. In the same or a different application, the outlets 32 and 38 of the system turbine 26 and the system compressor 28 have substantially equal discharge pressures. In the same or a different application, the system 10 also includes a heat exchanger 60 which receives heat from the aircraft 20 and which gives up heat to the compressed air 34 upstream of the inlet 30 of the system turbine 26.

A method of the invention is for providing air 12 to an inlet 14 of a compressor 16 of a non-aircraft-propelling auxiliary gas turbine engine 18 of an aircraft 20 having an aircraft-propelling gas turbine engine 22. The method includes providing compressed air 34 from the aircraft 20 to an inlet 30 of a system turbine 26 mechanically coupled to a system compressor 28. The method includes providing atmospheric air 40 to an inlet 36 of the system compressor 28. The method includes providing the inlet 14 of the compressor 16 of the auxiliary gas turbine engine 18 with air 12' from an outlet 32 of the system turbine 26 and with air 12" from an outlet 38 of the system compressor 28.

In a first enablement of the method, the compressed air 34 is one of pressurized air 34' from a cabin 42 of the aircraft 20 and pressurized air 34" (shown in dashed line, such as bleed air from a compressor and/or bypass duct) from the aircraft-propelling gas turbine engine 22. In a third enablement, the compressed air 34 is a combination of pressurized air 34' from the cabin and pressurized 34" air from the aircraft-propelling gas turbine engine 22. Other enablements are left to the artisan.

In one implementation, the method also includes operatively connecting the auxiliary gas turbine engine 18 to an electric power generator 46. In one application, the method also includes fluidly connecting the outlets 32 and 38 of the system turbine 26 and the system compressor 28 to the inlet 14 of the compressor 16 of the auxiliary gas turbine engine 18 through a flow mixer 58. In the same or a different application, the method also includes discharging air from the outlets 32 and 38 of the system turbine 26 and the system compressor 28 to the flow mixer 58 at substantially equal discharge pressures. In the same or a different application, the method also includes adding waste heat from the aircraft to the compressed air 34 upstream of the inlet 30 of the system turbine 26.

In one example of one or more or all of the method and the expressions of the embodiment of the invention, the compressed air 34 from the aircraft 20 is used to entrain and compress atmospheric air 40, and the combined flow of air 12 which is directed to the inlet 14 of the compressor 16 of the auxiliary gas turbine engine 18 has a greater mass flow than the compressed air 34 or the atmospheric air 40 at a temperature and pressure somewhere between the temperatures and pressures of the compressed air 34 and the atmospheric air 40. In this example, the system 10 acts as a flow multiplier by expanding the compressed air through the system turbine 26 which in turn drives the system compressor 28 which compresses the atmospheric air 40. In one variation of this example, the system 10 allows the auxiliary gas turbine engine 18 to produce greater power at altitude for the same operating temperature.

In one modification of this example, the system 10, by expanding the compressed air 34 from the aircraft 10 through the system turbine 26 prior to further compression, alleviates the presence of an adverse pressure gradient leading back to the origin (e.g., the cabin 42 and/or the aircraft-propelling gas turbine engine 22) of the compressed air 34 from the aircraft 20 avoiding surge/stall problems associated with adverse pressure gradients and avoiding the complexity of providing acoustic isolation. In the same or a different modification, aircraft components are cooled by a cooling system (not shown or otherwise described) which sends its waste heat to the heat exchanger 60 with the result that such aircraft waste heat is recovered and used by the system 10 to further increase the mass flow of the air 12 directed to the inlet 14 of the compressor 16 of the auxiliary gas turbine engine 18. In the same or a different modification, having the discharge pressures from the outlets 32 and 38 of the system turbine 26 and the system compressor 28 be substantially equal allows the mixing at the flow mixer 58 to be done with minimal losses.

In one illustration of this example, the system 10 trades entropy generation (efficiency) for the ability to make power, with the possibility of reducing flight idle thrust at altitude of the aircraft-propelling gas turbine engine 22 while maintaining adequate electrical power generation from the electric power generator 46, as can be appreciated by those skilled in the art.

While the present invention has been illustrated by a description of a method and several expressions of an embodiment, it is not the intention of the applicants to restrict or limit the spirit and scope of the appended claims to such detail. Numerous other variations, changes, and substitutions will occur to those skilled in the art without departing from the scope of the invention.

The invention claimed is:

1. A system, for providing air to an inlet of a compressor of a non-aircraft-propelling auxiliary gas turbine engine of an aircraft having an aircraft-propelling gas turbine engine, comprising:
   a) a system turbine having an inlet and an outlet, wherein the inlet of the system turbine receives compressed air from the aircraft;
   b) a system compressor mechanically coupled to the system turbine and having an inlet and an outlet, wherein the inlet of the system compressor receives atmospheric air, and wherein the outlets of the system turbine and the system compressor are in fluid communication with the inlet of the compressor of the auxiliary gas turbine engine.

2. The system of claim 1, wherein the aircraft has a cabin, and wherein the compressed air is pressurized air from the cabin.

3. The system of claim 1, wherein the compressed air is pressurized air from the aircraft-propelling gas turbine engine.

4. The system of claim 1, wherein the auxiliary gas turbine engine is operatively connected to an electric power generator.

5. The system of claim 1, also including a flow mixer, wherein the outlets of the system turbine and the system compressor are in fluid communication, through the flow mixer, with the inlet of the compressor of the auxiliary gas turbine engine.

6. The system of claim 1, wherein the outlets of the system turbine and the system compressor have substantially equal discharge pressures.

7. The system of claim 1, also including a heat exchanger which receives heat from the aircraft and which gives up heat to the compressed air upstream of the inlet to the system turbine.

8. A method for providing air to an inlet of a compressor of a non-aircraft-propelling auxiliary gas turbine engine of an aircraft having an aircraft-propelling gas turbine engine, comprising:
   a) providing compressed air from the aircraft to an inlet of a system turbine mechanically coupled to a system compressor;
   b) providing atmospheric air to an inlet of the system compressor;
   c) providing the inlet of the compressor of the auxiliary gas turbine engine with air from an outlet of the system turbine and with air from an outlet of the system compressor.

9. The method of claim 8, wherein the compressed air is one of pressurized air from a cabin of the aircraft and pressurized air from the aircraft-propelling gas turbine engine.

10. The method of claim 8, also including operatively connecting the auxiliary gas turbine engine to an electric power generator.

11. The method of claim 8, also including fluidly connecting the outlets of the system turbine and the system compressor to the inlet of the compressor of the auxiliary gas turbine engine through a flow mixer.

12. The method of claim 11, also including discharging air from the outlets of the system turbine and the system compressor to the flow mixer at substantially equal discharge pressures.

13. The method of claim 8, also including adding waste heat from the aircraft to the compressed air upstream of the inlet to the system turbine.

14. The system of claim 1, wherein the atmospheric air is ram air from one of an inlet of an Environmental Control System and an aircraft inlet dedicated to supplying air to the inlet of the system compressor.

15. The method of claim 8, wherein the atmospheric air is ram air from one of an inlet of an Environmental Control System and an aircraft inlet dedicated to supplying air to the inlet of the system compressor.

* * * * *